H. F. WAGNER AND S. G. NEEB.
ILLUMINATED LICENSE PLATE.
APPLICATION FILED DEC. 20, 1921.

1,433,314.

Patented Oct. 24, 1922.

Witness:
R. E. Weber

Inventors:
Henry F. Wagner
Samuel G. Neeb

Young & Young
Attorneys

Patented Oct. 24, 1922.

1,433,314

UNITED STATES PATENT OFFICE.

HENRY F. WAGNER AND SAMUEL G. NEEB, OF MILWAUKEE, WISCONSIN.

ILLUMINATED LICENSE PLATE.

Application filed December 20, 1921. Serial No. 523,646.

*To all whom it may concern:*

Be it known that we, HENRY F. WAGNER and SAMUEL G. NEEB, both citizens of the United States, and residents of Milwaukee, in the county of Milwaukee and State of Wisconsin, have invented certain new and useful Improvements in Illuminated License Plates; and we do hereby declare that the following is a full, clear, and exact description thereof.

Our invention relates to an illuminated license plate, and its principal object is the provision of means by which the plate may be plainly illuminated at night and will also be plainly visible in the day time.

It is also an object of the invention to provide suitable means, whereby a full effect of the illumination from the tail-light will be utilized in the illumination of the license plate and at the same time the latter will serve as a protection for the light.

A still further object of the invention is to provide means for facilitating the attachment of the license plate which will also serve to secure the plate as well as the light bulb against possible loss or damage.

With the above and other objects in view, the invention consists in certain details of construction, as shown in the accompanying drawing, in which—

Figure 1:
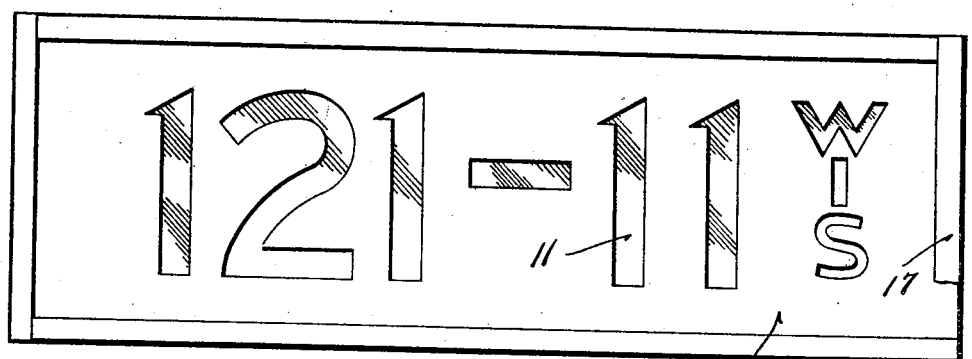
Figure 1 is a rear elevational view of our invention.
Figure 2:
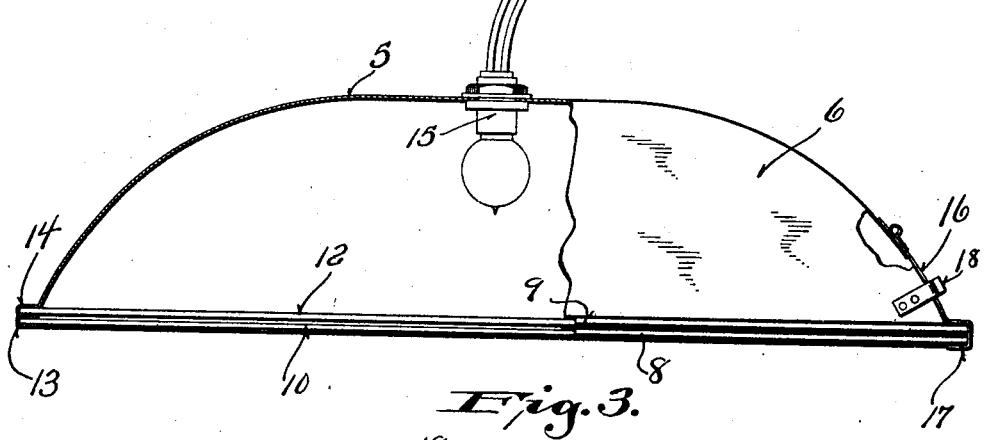
Figure 2 is a plan view with a portion broken away to show the interior construction.
Figure 3:
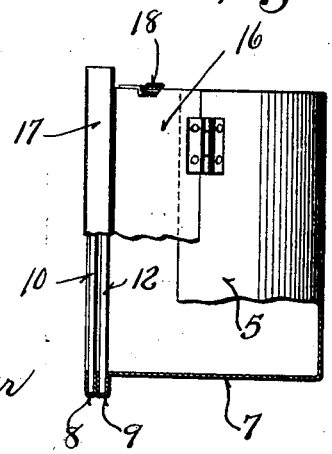
Figure 3 is an end view partly in elevation and partly in section.

Referring more particularly to the drawing, the invention comprises a casing having preferably a curved side 5 and flat top and bottom portions 6 and 7. The outer edge portions of the top and bottom are provided with pairs of opposed grooves 8 and 9. The license plate 10, which may be of any suitable material, is slidably received within the outer pair of grooves 8, and the digits, representing the license numbers, are cut out therefrom, as shown at 11. A glass screen 12 of the color desired to be displayed, is slidably inserted within the grooves 9. The curved portion 5 of the casing is formed at one end with a pair of grooves 13 and 14, which receive the ends of the plate and screen, respectively. The curved side 5 is also provided with an electric light socket 15, which supports an electric light bulb within the casing. The curved side of the casing is also provided at the end adjacent to which the plate and screen are inserted with a hinged door 16, the free edge portion of which is formed into a lip 17 which is adapted to extend around the ends of the plate and screen, to secure them against accidental removal. The door is provided with suitable securing means, as shown at 18.

It is to be noted that the reflector 5 is formed of sheet metal and may be conveniently stamped. It is provided with a pair of parallel grooves, as previously described, which are readily formed by folding operations, employing an integral portion of the reflector. It is to be noted that the door is provided with a grooved lip 17 adapted to span both the license plate and the colored screen. In this manner an extremely cheap and simple construction is attained. The peculiar construction of the door, that is to say the grooved lip 17, will prevent rattling more readily than will a flat abutting portion of the door, as such lip engages opposite sides of the license plate and screen and securely retains them in position, the catch 18 quickly and securely locking the door in position.

It will be seen, from the above description, that when the electric light is illuminated, its full power will be directed upon the license plate, and the screen 12 will diffuse the light so that the license number will be plainly illuminated. In the day time, the screen will also serve to intensify the visibility of the numbers by the reflection of the light and its color which will contrast to the color of the plate 10.

By means of the construction shown. it will also be seen that the license plate and screen, as well as the entire bulb, will be completely protected against loss or damage.

It will be also understood from the above description that the light in the socket 15 will take the place of the usual tail light so that the casing forms a support for the tail light and a protection therefor, and at the same time provides means for readily attaching the license plate in position to be illuminated thereby.

We claim:

1. A device of the character described comprising a casing having an electric light socket therein, one side of said casing being formed by a removable license plate having the digits cut out therefrom, said casing having a pair of grooves formed therein in which said plate is slidably held, a second pair of grooves adjacent the first pair and having a colored glass screen slidably held therein, a hinged door at one end of the casing and provided with a lip extending over the ends of the screen and plate to retain them in position and means for securing the door in closed position.

2. A combined license plate holder and tail light comprising a sheet metal reflector having a curved rear portion, and flat top, bottom and ends, and having a pair of parallel inwardly directed grooves located adjacent the marginal edges of its top, bottom and one end portion and formed of folded portions of said reflector; an electric lamp socket secured within and at the rear portion of said reflector; a colored screen carried in the inner groove; a license plate having cut out digits located and carried in the the outer groove; a hinged door forming a continuation of one end portion and having a grooved lip spanning the edges of both the screen and plate; and a catch for securely retaining the door in position.

In testimony that we claim the foregoing we have hereunto set our hands at Milwaukee, in the county of Milwaukee and State of Wisconsin.

HENRY F. WAGNER.
SAMUEL G. NEEB.